United States Patent
Sugiyama et al.

(10) Patent No.: US 10,534,379 B2
(45) Date of Patent: Jan. 14, 2020

(54) PRESSURE REDUCING VALVE

(71) Applicants: JTEKT CORPORATION, Osaka-shi, Osaka (JP); TOYOTA JIDOSHA KABUSHIKI KAISHA, Toyota-shi, Aichi-ken (JP); SOKEN, INC., Nisshin, Aichi-pref (JP)

(72) Inventors: Kazuhisa Sugiyama, Okazaki (JP); Koji Nishi, Anjo (JP); Akira Nakano, Okazaki (JP); Yutaka Hotta, Toyota (JP); Akira Yamashita, Toyota (JP); Shota Yamamoto, Toyota (JP); Yasushi Mitsuishi, Anjo (JP)

(73) Assignees: JTEKT CORPORATION, Osaka-shi (JP); TOYOTA TECHNICAL DEVELOPMENT CORPORATION, Toyota (JP); SOKEN, INC., Nisshin (JP)

( * ) Notice: Subject to any disclaimer, the term of this patent is extended or adjusted under 35 U.S.C. 154(b) by 5 days.

(21) Appl. No.: 16/110,617

(22) Filed: Aug. 23, 2018

(65) Prior Publication Data
US 2019/0072988 A1   Mar. 7, 2019

(30) Foreign Application Priority Data
Sep. 4, 2017   (JP) .................................. 2017-169428

(51) Int. Cl.
G05D 16/06    (2006.01)
G05D 16/10    (2006.01)
(Continued)

(52) U.S. Cl.
CPC ....... *G05D 16/0661* (2013.01); *G05D 16/107* (2019.01); *H01M 8/04104* (2013.01);
(Continued)

(58) Field of Classification Search
CPC ............ Y10T 137/7825; F16K 31/122; F16K 31/1221; F16K 31/1223; G05D 16/10;
(Continued)

(56) References Cited

U.S. PATENT DOCUMENTS

| | | | |
|---|---|---|---|
| 8,028,716 B2 * | 10/2011 | Suzuki | F16K 31/122 137/505.42 |
| 8,707,986 B2 * | 4/2014 | Santos | F16K 1/305 137/505.29 |

(Continued)

FOREIGN PATENT DOCUMENTS

| | | |
|---|---|---|
| JP | 2006-185103 A | 7/2006 |
| JP | 2015-219895 A | 12/2015 |
| JP | 2016-085627 A | 5/2016 |

OTHER PUBLICATIONS

Feb. 11, 2019 Extended European Search Report issued in European Patent Application No. 18191917.6.

*Primary Examiner* — Jessica Cahill
(74) *Attorney, Agent, or Firm* — Oliff PLC (57) ABSTRACT

A pressure reducing valve includes a body, an annular valve seat, a valve element, and a pressing mechanism configured to press the valve element. The pressing mechanism includes a plug provided downstream of the valve seat and having a plug hole, and a pin including a sliding portion and an upstream end, the sliding portion having a shaft shape and being inserted in the plug hole such that a gap is provided between the sliding portion and an inner peripheral surface of the plug hole, and the upstream end being provided upstream of the sliding portion so as to contact the valve element. A fitting length of the sliding portion with respect to the plug hole and the gap between the sliding portion and the plug hole satisfy 0.0005 L<C<0.00908 L, where L indicates the fitting length, and C indicates the gap.

2 Claims, 6 Drawing Sheets

(51) Int. Cl.
*F16K 31/122* (2006.01)
*H01M 8/04089* (2016.01)
*H01M 8/04746* (2016.01)

(52) U.S. Cl.
CPC ....... H01M 8/04753 (2013.01); *F16K 31/122* (2013.01); *Y10T 137/7825* (2015.04)

(58) Field of Classification Search
CPC ............ G05D 16/107; G05D 16/0661; H01M 8/04104; H01M 8/04753
See application file for complete search history.

(56) References Cited

U.S. PATENT DOCUMENTS

| | | | | |
|---|---|---|---|---|
| 8,967,180 | B2* | 3/2015 | Yamauchi | G05D 16/163 137/116.3 |
| 2008/0105309 | A1* | 5/2008 | Kuroyanagi | F16K 31/1221 137/505.41 |
| 2008/0202603 | A1 | 8/2008 | Shima et al. | |
| 2009/0308465 | A1* | 12/2009 | Suzuki | F16K 27/0254 137/317 |
| 2011/0114867 | A1* | 5/2011 | Suzuki | G05D 16/107 251/324 |
| 2013/0146157 | A1* | 6/2013 | Hsiao | G05D 16/0691 137/505.39 |
| 2014/0158237 | A1* | 6/2014 | Haneda | F16K 51/00 137/599.01 |
| 2016/0118676 | A1 | 4/2016 | Shima et al. | |

* cited by examiner

| | EXAMPLE a1 | EXAMPLE a2 | EXAMPLE a3 | EXAMPLE a4 | EXAMPLE a5 | EXAMPLE a6 | COMPARATIVE EXAMPLE a7 | COMPARATIVE EXAMPLE a8 | COMPARATIVE EXAMPLE a9 |
|---|---|---|---|---|---|---|---|---|---|
| RELATIONSHIP BETWEEN C AND L | C < 0.00122L | C < 0.00175L | C < 0.00367L | C < 0.00611L | C < 0.00873L | C < 0.00908L | C < 0.0119L | C < 0.0136L | C < 0.0140L |
| IMAGE INCLINATION ANGLE (deg) | 0.07 | 0.10 | 0.21 | 0.35 | 0.50 | 0.52 | 0.68 | 0.78 | 0.80 |
| SOUND PRESSURE (dB) | 27.8 | 24.4 | 26.8 | 24.2 | 26.5 | 28.9 | 35.0 | 38.2 | 30.7 |
| WHETHER HIGH-FREQUENCY FLOW NOISE IS SENSED OR NOT | NOT SENSED | NOT SENSED | NOT SENSED | NOT SENSED | NOT SENSED | NOT SENSED | SENSED | SENSED | SENSED |

FIG. 8

| | EXAMPLE b1 | EXAMPLE b2 | EXAMPLE b3 | EXAMPLE b4 | EXAMPLE b5 | EXAMPLE b6 | COMPARATIVE EXAMPLE b7 |
|---|---|---|---|---|---|---|---|
| RELATIONSHIP BETWEEN C AND L | C < 0.00192L | C < 0.00454L | C < 0.00454L | C < 0.00524L | C < 0.00593L | C < 0.00593L | C < 0.0218L |
| STRUCTURAL MAXIMUM INCLINATION ANGLE (deg) | 0.11 | 0.26 | 0.26 | 0.30 | 0.34 | 0.34 | 1.25 |
| HIGH-FREQUENCY FLOW NOISE OCCURRENCE RATE (%) | 0 | 0 | 0 | 30 | 9.5 | 0 | 81 |

PRESSURE REDUCING VALVE

INCORPORATION BY REFERENCE

The disclosure of Japanese Patent Application No. 2017-169428 filed on Sep. 4, 2017 including the specification, drawings and abstract is incorporated herein by reference in its entirety.

BACKGROUND

1. Technical Field

The disclosure relates to a pressure reducing valve.

2. Description of Related Art

There is a pressure reducing valve (a regulator) configured to adjust a pressure of high-pressure hydrogen gas or the like used for a fuel-cell vehicle in related art (for example, Japanese Unexamined Patent Application Publication No. 2016-85627 (JP 2016-85627 A)). Such a pressure reducing valve includes a valve mechanism (an opening/closing valve) provided between a primary port and a secondary port in a body, and a pressing mechanism configured to press a valve element in accordance with a pressure on the secondary port-side so as to change an opening amount (an opening degree) of the valve mechanism. The pressure of the high-pressure hydrogen gas flowing from the primary port is reduced in accordance with the opening amount of the valve mechanism, and the hydrogen gas with the reduced pressure is sent to the secondary port.

More specifically, the pressing mechanism includes a plug provided downstream of a valve seat and having a plug hole extending through the plug in an axial direction, a shaft-shaped pin accommodated in the plug hole so as to be able to reciprocate, a cylinder provided downstream of the plug, a piston accommodated in the cylinder so as to be able to reciprocate and configured to contact the pin, and a spring configured to urge the piston toward the pin. The piston sections (i.e., divides) the cylinder into a pressure adjusting chamber connected to the secondary port and a pressure-reducing chamber in which the spring is accommodated. The piston presses the pin with a load corresponding to a differential pressure between the pressure adjusting chamber and the pressure-reducing chamber and an urging force of the spring, and thus, the pin transmits the load to the valve element. Thus, the valve element is pressed by the pressing mechanism in accordance with the pressure on the secondary port-side.

SUMMARY

The pressure of the high-pressure hydrogen gas is reduced at the time when the high-pressure hydrogen gas passes through a passage narrowed by the valve mechanism, and the hydrogen gas with the reduced pressure is sent to the secondary port. Therefore, when the flow rate of the hydrogen gas suddenly becomes high at the time when the hydrogen gas passes through the valve mechanism, a turbulent flow occurs, and thus, high-frequency flow noise (whistling noise) may occur.

The disclosure provides a pressure reducing valve that can restrain occurrence of high-frequency flow noise.

A pressure reducing valve according to an aspect of the disclosure includes a body in which a primary port and a secondary port are provided; a valve seat having an annular shape and a valve hole, the valve seat being provided in an intermediate portion of a gas passage that connects the primary port to the secondary port; a valve element provided upstream of the valve seat such that a gap is provided between the valve element and an inner peripheral surface of the gas passage, the valve element being configured to make contact with and move away from the valve seat; and a pressing mechanism configured to press the valve element in a direction in which the valve element moves away from the valve seat, in accordance with a pressure of the secondary port. The pressing mechanism includes a plug provided downstream of the valve seat and having a plug hole extending through the plug in an axial direction of the valve hole, and a pin including a sliding portion and an upstream end, the sliding portion having a shaft shape and being inserted in the plug hole such that a gap is provided between the sliding portion and an inner peripheral surface of the plug hole, and the upstream end being provided upstream of the sliding portion so as to contact the valve element. The pin and the plug are provided such that a fitting length of the sliding portion with respect to the plug hole and the gap between the sliding portion and the plug hole satisfy a following expression: $0.0005\ L < C < 0.00908\ L$, where $L$ indicates the fitting length of the sliding portion with respect to the plug hole, and $C$ indicates the gap between the sliding portion and the plug hole.

As a result of diligent studies, the inventors of the disclosure found that inclination of the pin relates to a factor that causes high-frequency flow noise. A mechanism of the occurrence is presumed as follows. That is, in order to enable smooth reciprocating movement of the valve element and the pin, the valve element is inserted in the gas passage with a gap and the pin is inserted in the plug hole with a gap. Accordingly, the pin may have a slightly inclined posture in the plug hole. As a result, the pin in such an inclined posture may press the valve element so that the valve element is moved away from the valve seat. In this case, the valve element does not move along the axis direction of the valve seat and the valve element moves along the inclination of the pin, and thus, a section of a passage formed between the valve hole of the valve seat and the valve element does not have a symmetric shape around the axis of the valve seat. Thus, a narrow part and a wide part are formed in the passage formed between the valve hole and the valve element. Accordingly, there is a difference in flow rate of gas passing through the passage. It is presumed that, when the difference in flow rate becomes larger, a turbulent flow occurs so that high-frequency flow noise occurs.

As a result of further research and development based on the findings, the inventors found that, even in a case where the valve element moves along the inclination of the pin, when the inclination angle of the pin with respect to the axis is 0.52 degrees or less, the difference between the narrow part and the wide part in the passage formed between the valve hole and the valve element is unlikely to be excessively large, and thus, occurrence of flow noise is restrained. In this regard, in the above-described configuration, the relationship between the gap $C$ and the fitting length $L$ is set to $0.0005\ L < C < 0.00908\ L$, and thus, an angle at which the pin can be structurally (geometrically) inclined in the plug hole to the maximum extent is restricted to 0.52 degrees. Accordingly, in the passage between the valve hole and the valve element, it is possible to restrain the difference between the narrow part and the wide part from being excessively large. Thus, it is possible to reduce a difference in flow rate of the gas passing through the passage, thereby making it possible to restrain the occurrence of high-frequency flow noise.

In the pressure reducing valve according to the above-described aspect, the fitting length and the gap between the sliding portion and the plug hole may satisfy a following expression: $0.0005\ L < C < 0.00454\ L$. In the configuration, the relationship between the gap C and the fitting length L is set to $0.0005\ L < C < 0.00454\ L$, and thus, the angle at which the pin can be structurally inclined in the plug hole to the maximum extent is restricted to 0.26 degrees. This makes it possible to reduce an occurrence rate of high-frequency flow noise to an extremely low rate.

According to the aspect of the disclosure, it is possible to restrain the occurrence of flow noise.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
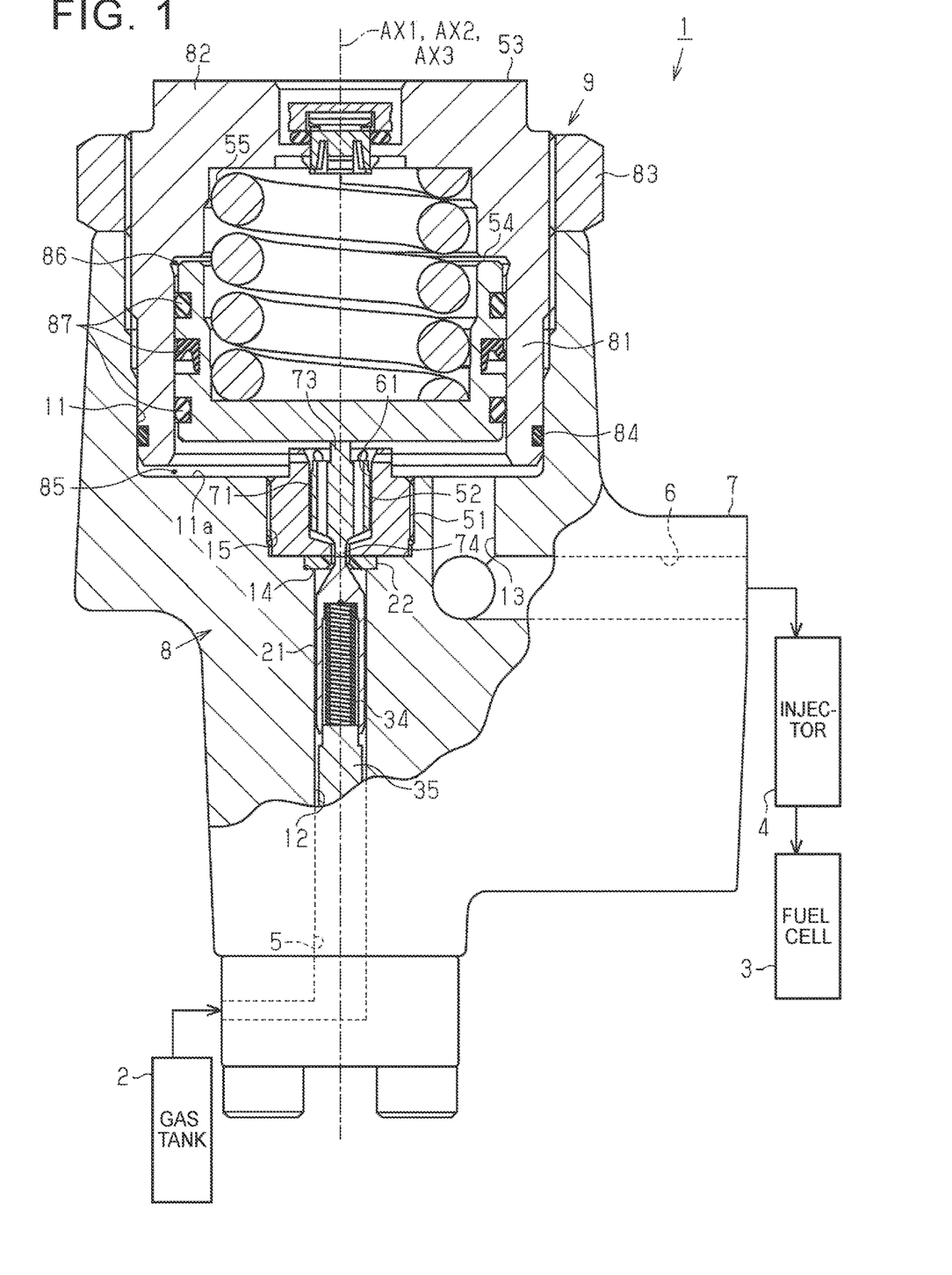
FIG. 1 is a partial sectional view of a pressure reducing valve.

A pressure reducing valve according to an embodiment of the disclosure will be described with reference to the drawings. A pressure reducing valve (a regulator) 1 illustrated in FIG. 1 is provided in an intermediate portion of a fluid circuit that connects a gas tank 2 for hydrogen gas, which is provided in a fuel-cell vehicle, to an injector 4 configured to supply the hydrogen gas to a fuel cell 3. The pressure reducing valve 1 is configured to reduce a high pressure (e.g., approximately 87.5 MPa at the highest) of the hydrogen gas to a pressure (e.g., approximately 1.2 MPa), and send the hydrogen gas with the reduced pressure to the injector 4. Note that the injector 4 in the present embodiment is configured such that a supply amount of the hydrogen gas supplied to the fuel cell 3 is controlled by supplying driving electric power to a coil by turning on/off a switching element (the coil and the switching element are not shown herein) by PWM (pulse width modulation) control. As a duty ratio (an ON-OFF ratio) of the switching element becomes larger, the supply amount of the hydrogen gas increases.

The pressure reducing valve 1 includes a body 7 in which a primary port 5 and a secondary port 6 are formed, a valve mechanism 8 provided between the primary port 5 and the secondary port 6 in the body 7, and a pressing mechanism 9 configured to adjust an opening amount (an opening degree) of the valve mechanism 8.

Figure 2:
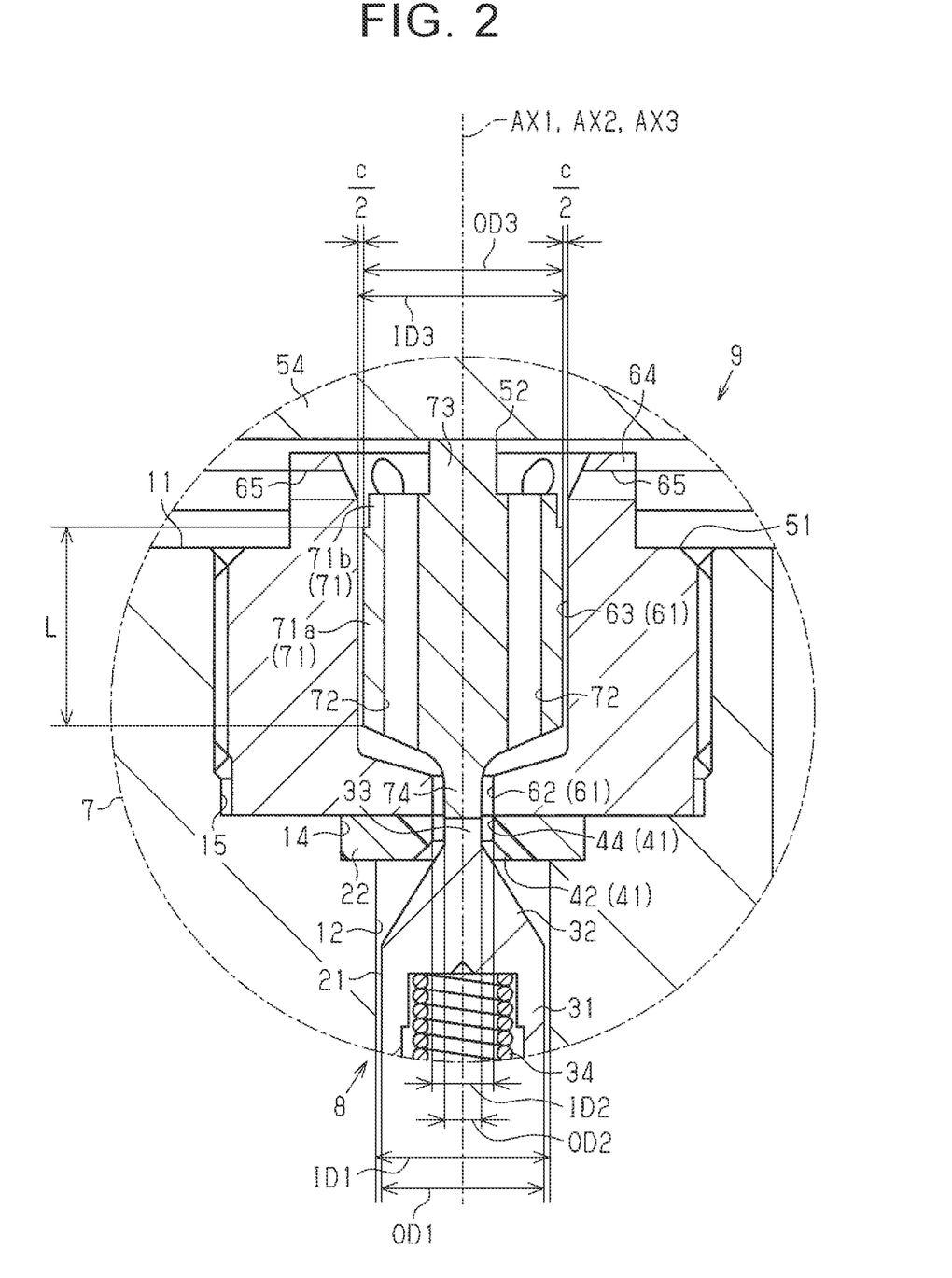
FIG. 2 is an enlarged sectional view of a plug, a pin, and components near the plug and the pin in the pressure reducing valve.

As illustrated in FIGS. 1 and 2, the body 7 has a round housing hole 11 that communicates with the primary port 5 and the secondary port 6. The housing hole 11 is opened outward. A supply passage 12 as a gas passage extending from the primary port 5 is opened in the center of a bottom face 11a of the housing hole 11, and a delivery passage 13 as a gas passage extending to the secondary port 6 is opened at an eccentric position on the bottom face of the housing hole 11. The supply passage 12 has a linear shape with a circular section, and its opening on the housing hole 11-side is set to have an inside diameter larger than those of other parts such that the valve mechanism 8 is accommodated therein. More specifically, the opening of the supply passage 12 includes, sequentially from the upstream side (the lower side in FIG. 1) of the supply passage 12, a cylindrical first housing portion 14, and a cylindrical second housing portion 15 that is continuous with the first housing portion 14 and opened on the bottom face 11a. The first and second housing portions 14, 15 are formed such that the second housing portion 15 has an inside diameter larger than that of the first housing portion 14 and they are disposed coaxially with the housing hole 11. Note that an inside diameter ID1 of a part of the supply passage 12 upstream of the opening is set to approximately 8 mm, for example, and as the pressure reducing valve 1 for a fuel-cell vehicle, the inside diameter ID1 may be in a range of approximately 4 mm to 16 mm.

The valve mechanism 8 includes a valve element (poppet valve) 21 accommodated in the supply passage 12, and a valve seat 22 accommodated in the first housing portion 14. The valve element 21 includes a tubular portion 31 having a bottomed tubular shape, a tapered head 32 having an outside diameter decreasing from a bottom portion of the tubular portion 31 toward the downstream side (the upper side in FIG. 1), and a columnar contact portion 33 projecting from a downstream end of the head 32. The tubular portion 31, the head 32, and the contact portion 33 are formed integrally on the same axis AX1. An outside diameter OD1 of the tubular portion 31 (the valve element 21) is set to be slightly smaller than the inside diameter ID1 of the supply passage 12. Note that the outside diameter OD1 of the tubular portion 31 is set to approximately 8 mm, for example, and as the pressure reducing valve 1 for a fuel-cell vehicle, the outside diameter OD1 may be in a range of approximately 4 mm to 16 mm. The valve element 21 is inserted in the supply passage 12 with a gap between the valve element 21 and an inner peripheral surface of the supply passage 12 such that the valve element 21 is disposed to be axially movable. Note that, in FIG. 2, for the sake of illustration, the gap between the supply passage 12 and the valve element 21 and a gap between a plug 51 and a pin 52 (described later) are illustrated in an exaggerated manner. An outer peripheral surface of the head 32 has a tapered shape with a substantially uniform inclination angle with respect to the axis AX1, and an outer peripheral surface of the contact portion 33 has a cylindrical shape substantially parallel to the axis AX1. Note that an outside diameter OD2 of the contact portion 33 of the present embodiment is set to approximately 1.8 mm, for example, and as the pressure reducing valve 1 for a fuel-cell vehicle, the outside diameter OD2 may be in a range of approximately 0.9 mm to 3.6 mm.

A coiled spring 34 is accommodated in the tubular portion 31. The coiled spring 34 is compressed between a bar-shaped support member 35 disposed in the upstream side of the supply passage 12 and the valve element 21. Thus, the valve element 21 is urged by the coiled spring 34 toward the valve seat 22.

The valve seat 22 is formed to have an annular shape having a valve hole 41 and is pressed into the first housing portion 14. Note that the valve seat 22 is made of elastically deformable hard resin such as polyimide resin. The valve hole 41 includes a tapered hole portion 42 and a cylindrical hole portion 44. The tapered hole portion 42 has a tapered inner peripheral surface whose inclination angle with respect to its axis AX2 is larger than the inclination angle of the head 32 with respect to its axis AX2. The cylindrical hole portion 44 has a cylindrical inner peripheral surface parallel to the axis AX2. The tapered hole portion 42 and the cylindrical hole portion 44 are formed in the stated order from the upstream side. Note that an inside diameter ID2 of the cylindrical hole portion 44 is set to approximately 2.8 mm, for example, and as the pressure reducing valve 1 for a fuel-cell vehicle, the inside diameter ID2 may be in a range of approximately 1.4 mm to 5.6 mm.

The pressing mechanism 9 includes the plug 51 attached to the second housing portion 15, the pin 52 disposed inside the plug 51, a cylinder 53 fixed to the housing hole 11, a piston 54 slidably accommodated in the cylinder 53, and an urging member 55 such as a coiled spring disposed in a compressed state between the cylinder 53 and the piston 54.

The plug 51 has a columnar shape and is threadedly attached to an inner periphery of the second housing portion 15 while the plug 51 compresses the valve seat 22. A part of the plug 51 projects into the housing hole 11. A plug hole 61 axially extending through the plug 51 is formed in the center of the plug 51 such that the plug hole 61 and the valve hole 41 are on the same axis (the axis AX2). The plug hole 61 has a reduced-diameter hole portion 62 continuous with the valve hole 41 and a sliding hole portion 63 continuous with the reduced-diameter hole portion 62. The reduced-diameter hole portion 62 is configured such that an upstream portion thereof has a cylindrical shape having an inside diameter substantially equal to that of the valve hole 41 (the cylindrical hole portion 44) and a downstream portion thereof has a tapered shape having a diameter increasing toward the downstream side. The sliding hole portion 63 has a cylindrical shape having a substantially uniform inside diameter ID3 over its entire region in the axial direction thereof. Note that the inside diameter ID3 of the sliding hole portion 63 is set to approximately 10 mm, for example, and as the pressure reducing valve 1 for a fuel-cell vehicle, the inside diameter ID3 may be in a range of approximately 5 mm to 20 mm. Further, a projecting portion 64 of the plug 51, which projects into the housing hole 11, has a passage hole 65 extending radially such that the plug hole 61 communicates with the housing hole 11 via the passage hole 65.

The pin 52 includes a sliding portion 71 having a shaft shape, a downstream end 73 projecting from the sliding portion 71 toward the downstream side, and an upstream end 74 projecting from the sliding portion 71 toward the upstream side. The sliding portion 71, the downstream end 73, and the upstream end 74 are formed integrally on the same axis AX3. The sliding portion 71 of the present embodiment includes a body portion 71a sliding relative to an inner peripheral surface of the plug hole 61, and a relief portion 71b provided downstream of the body portion 71a and having an outside diameter smaller than the body portion 71a. An outside diameter OD3 of the body portion 71a is set to be slightly smaller than the inside diameter ID3 of the sliding hole portion 63 of the plug hole 61. Note that the outside diameter OD3 of the sliding portion 71 is set to approximately 10 mm, for example, and as the pressure reducing valve 1 for a fuel-cell vehicle, the outside diameter OD3 may be in a range of approximately 5 mm to 20 mm. Further, a fitting length L of the body portion 71a with respect to the sliding hole portion 63 is set to approximately 10 mm, for example, and as the pressure reducing valve 1 for a fuel-cell vehicle, the fitting length L may be in a range of approximately 5 mm to 20 mm. The fitting length L of the body portion 71a with respect to the sliding hole portion 63 is a length of a part of the body portion 71a, the part being fitted to the sliding hole portion 63. Note that the axial length of the relief portion 71b is set such that the body portion 71a does not project from the plug hole 61 along with an axial movement of the pin 52 inside the plug hole 61, and regardless of the position of the pin 52, the fitting length L is constant. The sliding portion 71 is inserted in the plug hole 61 with a gap C between the sliding portion 71 and the inner peripheral surface of the plug hole 61, and thus, the sliding portion 71 is disposed so as to be axially movable (i.e., so as to be movable in the axial direction). As shown in FIG. 2, the gap C is a difference between the inside diameter ID3 of the sliding hole portion 63 of the plug hole 61 and the outside diameter OD3 of the sliding portion 71 (the body portion 71a) of the pin 52.

In the present embodiment, the gap C is set so as to satisfy Expression (1), preferably to satisfy Expression (2).

$$0.0005\ L < C < 0.00908\ L \tag{1}$$

$$0.0005\ L < C < 0.00454\ L \tag{2}$$

Note that, 0.0005 L in Expressions (1), (2) indicates a minimum gap set so as to secure smooth sliding of the pin 52.

Expressions (1), (2) can be expressed as follows. That is, an intersection angle of the axis AX3 of the pin 52 with respect to the axis AX2 of the valve seat 22, that is, an inclination angle θ (=arctan (C/L)) at which the pin 52 can be structurally (geometrically) inclined to the maximum extent in the plug hole 61 satisfies Expression (3), and preferably satisfies Expression (4).

$$0.029° < \theta < 0.52° \tag{3}$$

$$0.029° < \theta < 0.26° \tag{4}$$

Further, the sliding portion 71 has a plurality of passage holes 72 extending in the axial direction such that the passage holes 72 are formed at regular angular intervals (i.e., at equal angular intervals) around the central axis of the sliding portion 71. The downstream end 73 has a columnar shape and has an outside diameter smaller than that of the sliding portion 71. The outside diameter of the upstream end 74 is set to be substantially equal to the outside diameter of the contact portion 33 in the valve element 21. The upstream end 74 and the contact portion 33 are inserted in the valve hole 41 and the plug hole 61 (the reduced-diameter hole portion 62) and contact each other.

As illustrated in FIG. 1, the cylinder 53 has a bottomed cylindrical shape. The cylinder 53 is fixed to the body 7 such that an outer peripheral portion of a cylindrical portion 81 of the cylinder 53 is threadedly attached to an inner periphery of the housing hole 11 and a locknut 83 is threadedly attached to an outer peripheral portion of a bottom portion 82 of the cylinder 53. Note that a sealing member 84 such as an O-ring is attached to an outer periphery of an open end-side of the cylindrical portion 81, so as to secure airtightness between the housing hole 11 and the outside.

The piston 54 has a bottomed cylindrical shape and an outside diameter thereof is set to be slightly smaller than the inside diameter of the cylindrical portion 81. The piston 54 is accommodated in the cylindrical portion 81 so as to be axially slidable with a posture in which a bottom portion of the piston 54 is disposed in the open end-side of the cylindrical portion 81, and thus, the cylindrical portion 81 is sectioned into (i.e., divided into) a pressure adjusting chamber 85 on the secondary port 6-side and a pressure-reducing chamber 86 with a pressure lower than that of the pressure adjusting chamber 85. Note that a ring member 87 such as a wearing ring or a lip seal is attached to an outer periphery of the piston 54, so as to secure airtightness between the pressure adjusting chamber 85 and the pressure-reducing chamber 86. The piston 54 contacts the downstream end 73 of the pin 52. Thus, the pin 52 and the valve element 21 move integrally (i.e., move together) along with sliding of the piston 54.

The urging member 55 is accommodated in a compressed state between the cylinder 53 and the piston 54. The urging member 55 urges the piston 54 so that the valve element 21 is moved away from the valve seat 22, that is, the opening amount of the valve mechanism 8 becomes large.

In the pressure reducing valve 1 configured as described above, the piston 54 slides inside the cylindrical portion 81 in accordance with a differential pressure between the pressure adjusting chamber 85 and the pressure-reducing chamber 86 (i.e., a difference between the pressure in the pressure adjusting chamber 85 and the pressure in the pressure-reducing chamber 86) and urging forces of the coiled spring 34 and the urging member 55. The opening amount of the valve mechanism 8, more strictly, a passage sectional area between the head 32 of the valve element 21 and an edge-shaped boundary portion between the tapered hole portion 42 and the cylindrical hole portion 44 is adjusted based on an axial position of the piston 54, and thus, the pressure on the secondary port 6-side (the pressure in the pressure adjusting chamber 85) is prevented from exceeding a predetermined pressure.

Next, effects of the present embodiment will be described. When the relationship between the gap C and the fitting length L is set to 0.0005 L<C<0.00908 L, the angle at which the pin 52 can be structurally inclined in the plug hole 61 to the maximum extent is restricted so as to be smaller than 0.52 degrees, thereby making it possible to restrain occurrence of high-frequency flow noise (whistling noise).

When the relationship between the gap C and the fitting length L is set to 0.0005 L<C<0.00454 L, the angle at which the pin 52 can be structurally inclined in the plug hole 61 to the maximum extent is restricted so as to be smaller than 0.26 degrees, thereby making it possible to reduce an occurrence rate of high-frequency flow noise to an extremely low rate.

Figure 3:
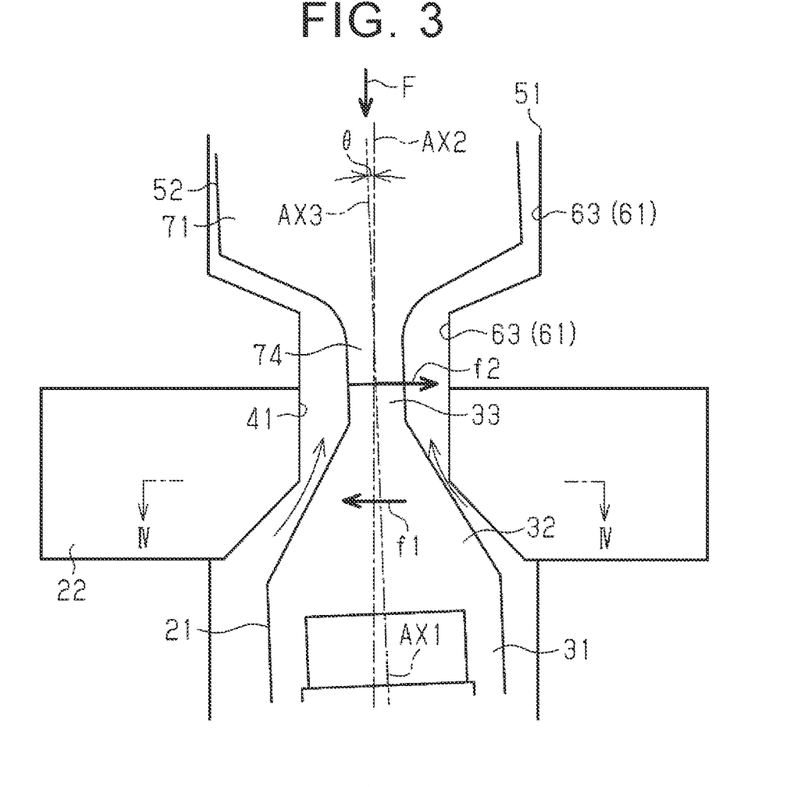
FIG. 3 is a schematic view illustrating a state where a valve element and the pin are inclined.
Figure 4:
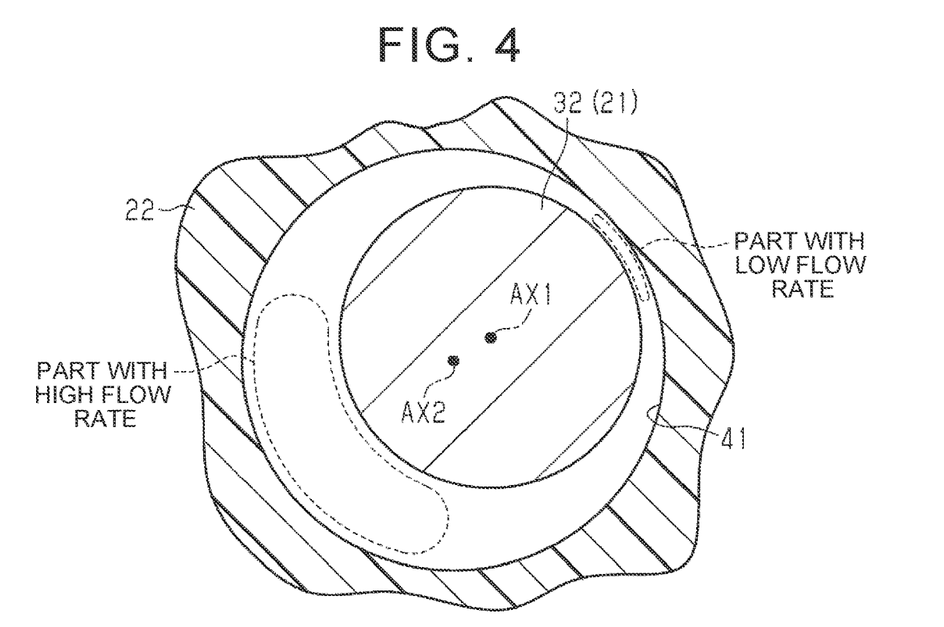
FIG. 4 is a sectional view (a sectional view along a line IV-IV in FIG. 3) illustrating the inside of a valve hole when the pin in an inclined posture presses the valve element.

The mechanism that can restrain the occurrence of high-frequency flow noise and reduce its occurrence rate to an extremely low rate is presumed as follows. In order to enable smooth reciprocating movement of the valve element 21 and the pin 52 as described above, the valve element 21 is inserted in the supply passage 12 with a gap and the pin 52 is inserted in the plug hole 61 with a gap. Accordingly, for example, as illustrated in FIG. 3, the pin 52 may have a slightly inclined posture in the plug hole 61, and the pin 52 in such an inclined posture may press the valve element 21 so that the valve element 21 is moved away from the valve seat 22. In this case, the valve element 21 does not move along the axis direction of the valve seat 22 and the valve element 21 moves along the inclination of the pin 52. Thus, as illustrated in FIG. 4, a section of the passage formed between the valve hole 41 and the valve element 21 does not have a symmetric shape around the axis AX2 of the valve seat 22. As a result, in the passage formed between the valve hole 41 and the valve element 21, a narrow part and a wide part are formed as indicated by broken lines in FIG. 4. Thus, there is a difference in flow rate of hydrogen gas passing through the passage. When the difference in flow rate becomes large, a turbulent flow occurs, and thus, high-frequency flow noise occurs. Note that FIG. 4 is a sectional view taken along the edge-shaped boundary portion between the tapered hole portion 42 and the cylindrical hole portion 44 in the valve hole 41.

The following further discusses this point in detail. That is, in the passage between the valve hole 41 and the valve element 21, a differential pressure between the upstream side and the downstream side of the valve element 21 (the head 32) is substantially equal over the entire region around the axis AX2, and therefore, the flow rate of hydrogen gas is high in the wide part and the flow rate is low in the narrow part. As a result, a pressure in a part (the narrow part) with a low flow rate of hydrogen gas becomes larger than that of a part (the wide part) with a high flow rate. Then, as illustrated in FIG. 3, a force f1 that causes the axial center of the valve element 21 to approach the axis AX2 of the valve seat 22 is applied to the valve element 21 in accordance with a pressure difference between the narrow part and the wide part in the passage. Further, when a load that the pin 52 receives from the pressing mechanism 9 is a load F and an inclination of the pin 52 is an inclination angle θ during the operation of the pressure reducing valve 1, a force f2 (=F×tanθ) that causes the axis AX1 of the valve element 21 to move away from the axis AX2 of the valve seat 22, i.e., to move radially outwardly is applied from the pin 52 to the valve element 21. Accordingly, in a steady state where the opening amount of the pressure reducing valve 1 is substantially constant, the force f1 is substantially equal to the force f2. Therefore, even when the pin 52 in an inclined posture presses the valve element 21, the eccentricity amount of the valve element 21 is substantially constant. Thus, by setting the inclination angle θ of the pin 52 appropriately, the eccentricity amount of the valve element 21, that is, a difference in flow rate caused in the passage between the valve hole 41 and the valve element 21 can be set to a value at which high-frequency flow noise does not occur. That is, the inclination of the pin 52 relates to a factor that causes high-frequency flow noise.

Note that, even in a case where the valve element 21 in an inclined posture sits on the valve seat 22, when the valve element 21 moves away from the valve seat 22 along the axis AX2 of the valve seat 22, a section of the passage formed between the valve hole 41 and the valve element 21 has a symmetric shape around the axis AX2 of the valve seat 22. Thus, it is considered that there is little influence on the occurrence of flow noise.

Accordingly, when the relationship between the gap C and the fitting length L is defined as described above and a maximum inclination of the pin 52 in the plug hole 61 is defined, it is possible to restrain the occurrence of high-frequency flow noise and to reduce its occurrence rate to an extremely low rate.

Note that the above embodiment may be appropriately modified as follows. In the embodiment, the sliding portion 71 includes the body portion 71a and the relief portion 71b. However, the disclosure is not limited to this configuration, and the sliding portion 71 may not include a relief portion. Note that, in this case, the fitting length L is set based on a position of the pin 52 at the time when the pressure reducing valve 1 is closed (i.e., at the time when the pressure reducing valve 1 is in a state where the valve element 21 sits on the valve seat 22).

In the above embodiment, a throttle hole portion having an inclination angle smaller than that of the tapered hole portion 42 may be formed between the tapered hole portion 42 and the cylindrical hole portion 44, and for example, the inclination angle of the throttle hole portion may be equal to the inclination angle of the head 32.

In each of the above embodiment and the modified embodiments, the pressure reducing valve 1 is used for the purpose of reducing the pressure of high-pressure hydrogen gas. However, the disclosure is not limited to this purpose, and the pressure reducing valve 1 may be used, for example, for the purpose of reducing the pressure of gas other than hydrogen, e.g., helium.

Figure 7:
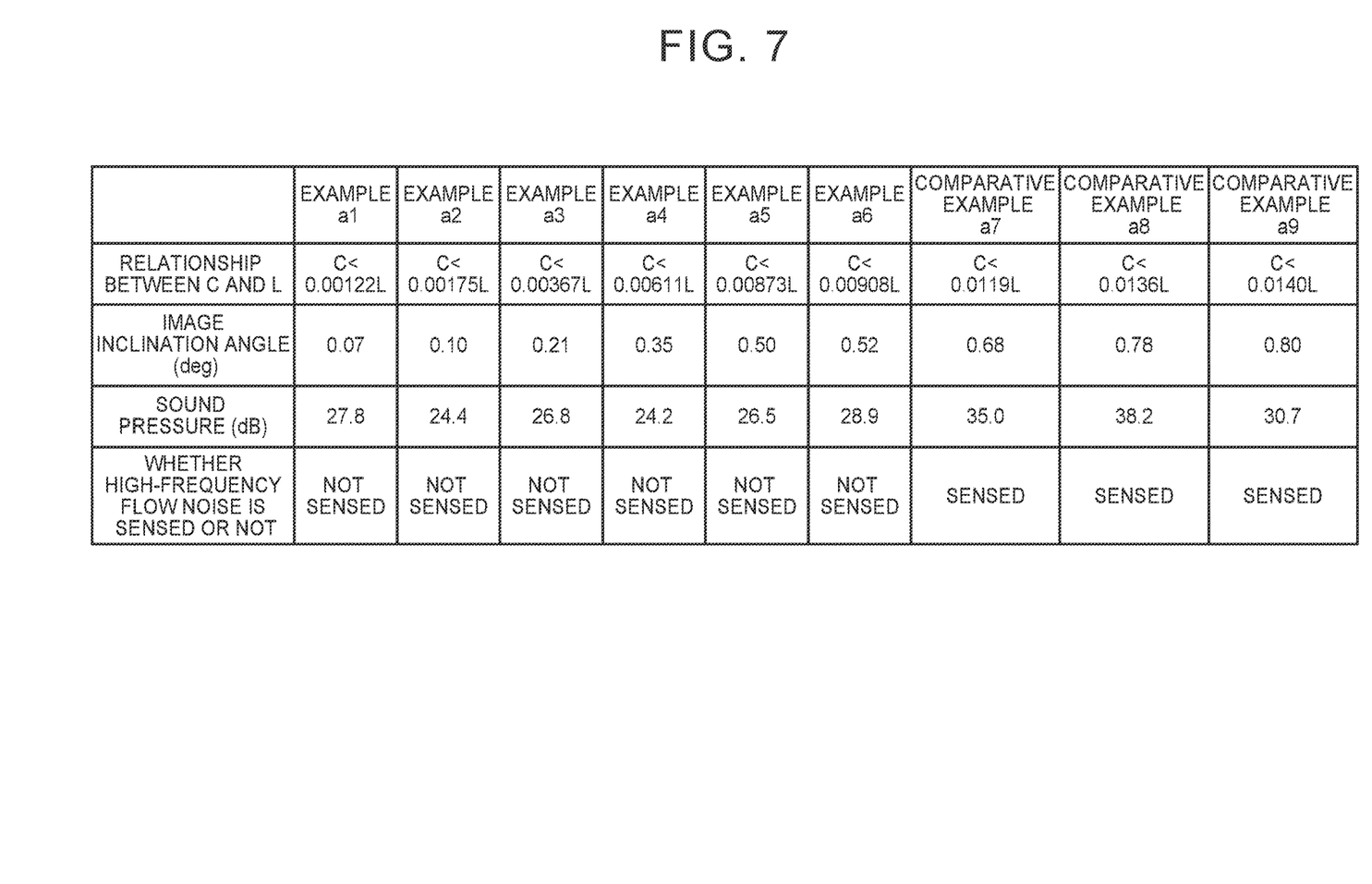
FIG. 7 illustrates results of tests with the use of examples and comparative examples.
Figure 8:
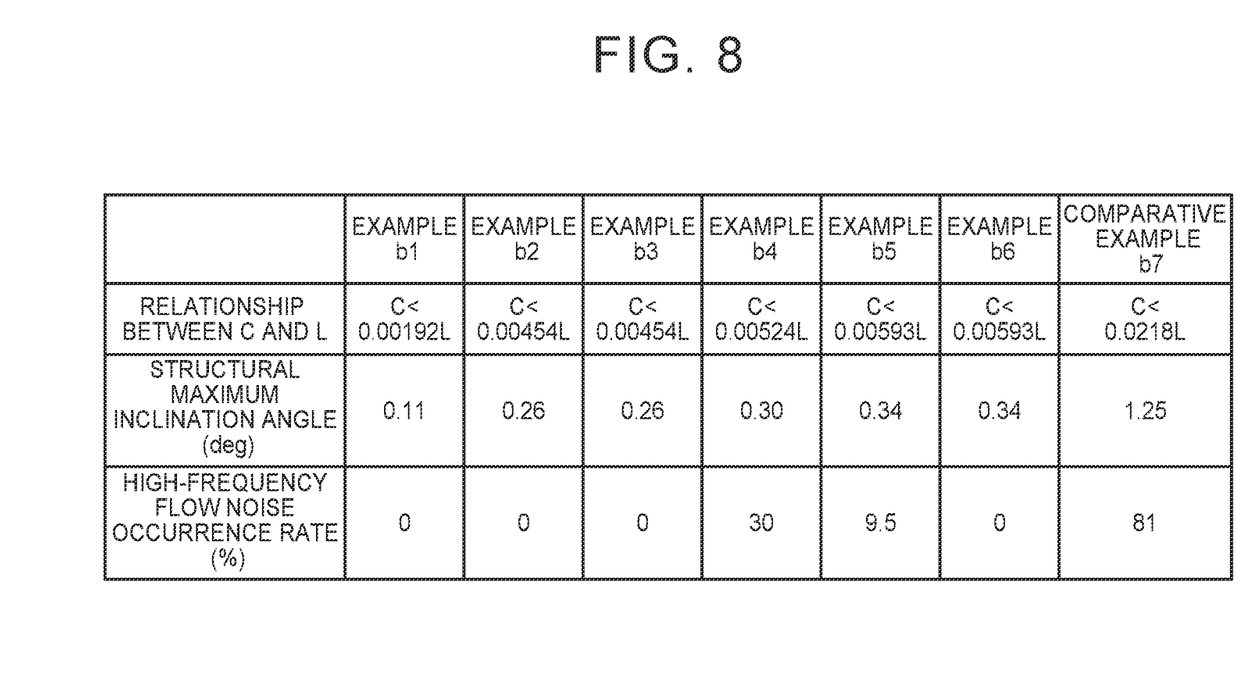
FIG. 8 illustrates results of tests with the use of the examples and the comparative examples.

The following describes examples in which the embodiment is further embodied. A plurality of pressure reducing valves 1 as illustrated in FIG. 1 was manufactured such that the pressure reducing valves 1 had different relationships between the gap C and the fitting length L of the sliding portion 71 with respect to the sliding hole portion 63. The gap C is a gap formed between the sliding hole portion 63 of the plug hole 61 and the sliding portion 71 of the pin 52. The examples and comparative examples were referred to as Examples a1 to a6 and b1 to b6 and Comparative Examples a7 to a9 and b7. The "fitting length L of the sliding portion 71 with respect to the sliding hole portion 63" signifies a length of a part of the sliding portion 71, the part being fitted to the sliding hole portion 63. In the examples and the comparative examples, the fitting length L of the sliding portion 71 with respect to the sliding hole portion 63 is a length of a part of the body portion 71a, the part being fitted to the sliding hole portion 63. As shown in FIGS. 7, 8, the examples and the comparative examples are different from each other in the relationship between the gap C and the fitting length L. Tests were performed by operating the pressure reducing valves 1 under conditions known from experience as conditions that easily cause high-frequency flow noise. Note that the conditions of the tests and reference dimensions and the like of the pressure reducing valves 1 used as the examples and the comparative examples are as follows.

The kind of gas was hydrogen gas or helium gas. The pressure (primary pressure) of the primary port 5 was approximately 35 MPa to 87 MPa. The pressure (secondary pressure) of the secondary port 6 was approximately 1.1 MPa to 1.3 MPa. The duty ratio of the injector 4 was approximately 48% to 90%. The inside diameter ID1 of the supply passage 12 was approximately 8 mm. The outside diameter OD1 of the tubular portion 31 of the valve element 21 was approximately 8 mm. The outside diameter OD2 of the contact portion 33 of the valve element was approximately 1.8 mm. The inside diameter ID2 of the cylindrical hole portion 44 of the valve seat 22 was approximately 2.8 mm. The outside diameter OD3 of the sliding portion 71 (the body portion 71a) of the pin 52 was approximately 10 mm. The fitting length L of the sliding portion 71 (the body portion 71a) of the pin 52 was approximately 10 mm. The inside diameter ID3 of the sliding hole portion 63 of the plug 51 was approximately 10 mm. As described above, it is presumed that high-frequency flow noise occurs when a turbulent flow occurs due to an increase of the difference in flow rate in the section of the passage between the valve hole 41 and the valve element 21. Accordingly, as the flow rate in the valve mechanism 8 is higher, high-frequency flow noise is more likely to occur. Accordingly, it is considered that even in a case where the primary pressure is a pressure of 35 MPa or less or even in a case where the duty ratio is a ratio of 48% or less, when the relationships between the gap C and the fitting length L in the examples shown in FIGS. 7, 8 are satisfied, the occurrence of high-frequency flow noise can be restrained similarly, because the flow rate decreases. Further, with regard to the dimensions of members which constitute the pressure reducing valve 1 and which do not have a large influence on the flow rate, it is expected that the occurrence of high-frequency flow noise can be restrained similarly, at least in a case where the dimensions are within the dimension ranges of the pressure reducing valve 1 for a fuel-cell vehicle described in the above embodiment or ranges that do not greatly deviate from the dimension ranges, as long as the relationships between the gap C and the fitting length L in the examples shown in FIGS. 7, 8 are satisfied. Note that the field of "RELATIONSHIP BETWEEN C AND L" in FIGS. 7 and 8 shows only an upper limit of "C" for the sake of convenience, and a lower limit of the gap C in each of Examples a1 to a6 and b1 to b6 and Comparative Examples a7 to a9 and b7 is "C>0.0005 L".

Figure 5:
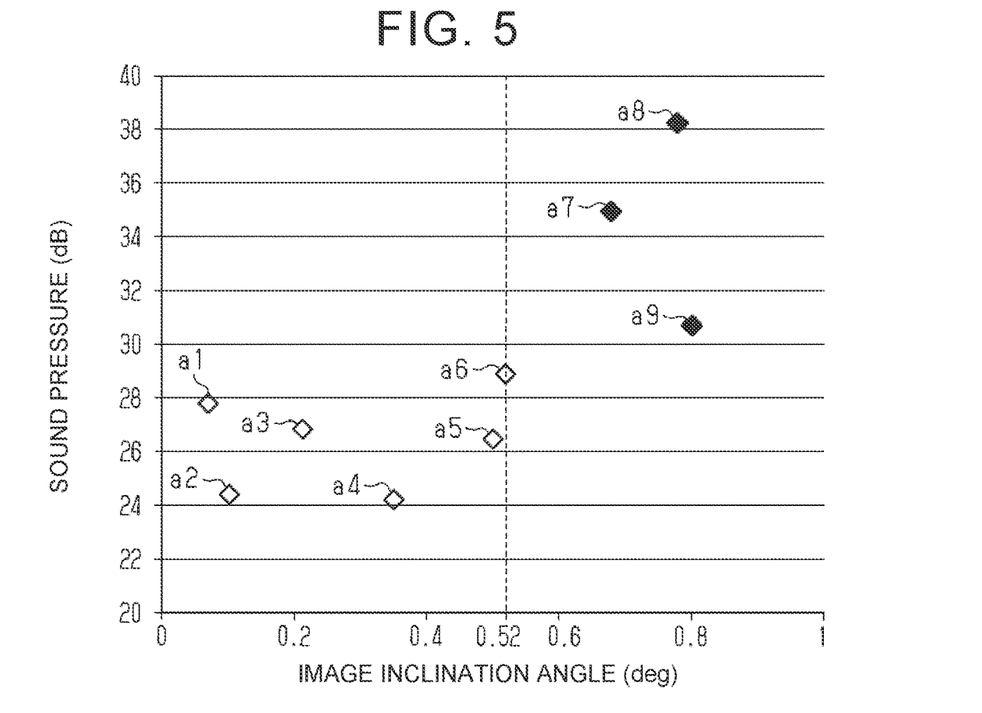
FIG. 5 is a graph illustrating a relationship between an image inclination angle of the pin and a sound pressure.

The test shown in FIGS. 7 and 5 was performed as follows. That is, in the pressure reducing valve 1, the plug 51 and a part, of the body 7, facing at least the plug 51 in the radial direction were constituted by transparent members such as glass, and the angle of the pin 52 during the operation of the pressure reducing valve 1 was captured by a camera or the like and loudness of generated sound (sound pressure) was measured. An image inclination angle indicates an inclination angle θ of the pin 52 with respect to the axis AX2, the inclination angle θ being obtained by analyzing a captured image. Note that outlined squares in FIG. 5 show results at the time when high-frequency flow noise could not be sensed (perceived) by the hearing sense of the inventors, and black squares show results at the time when high-frequency flow noise could be sensed (perceived) by the hearing sense of the inventors. In the field "WHETHER HIGH-FREQUENCY FLOW NOISE IS SENSED OR NOT" in FIG. 7, a case where high-frequency flow noise was not sensed (perceived) is indicated by "NOT SENSED" and a case where high-frequency flow noise was sensed (perceived) is indicated by "SENSED".

As shown in FIGS. 7 and 5, in a range where the inclination angle θ of the pin 52 is smaller than 0.52°, high-frequency flow noise was not sensed by the hearing sense of the inventors. From this result, it is found that, when the gap C and the fitting length L were set such that a structural maximum inclination angle of the pin 52 in the plug hole 61 was smaller than 0.52°, that is, when the relationship between the gap C and the fitting length L satisfied Expression (1), the occurrence of high-frequency flow noise could be restrained.

Figure 6:
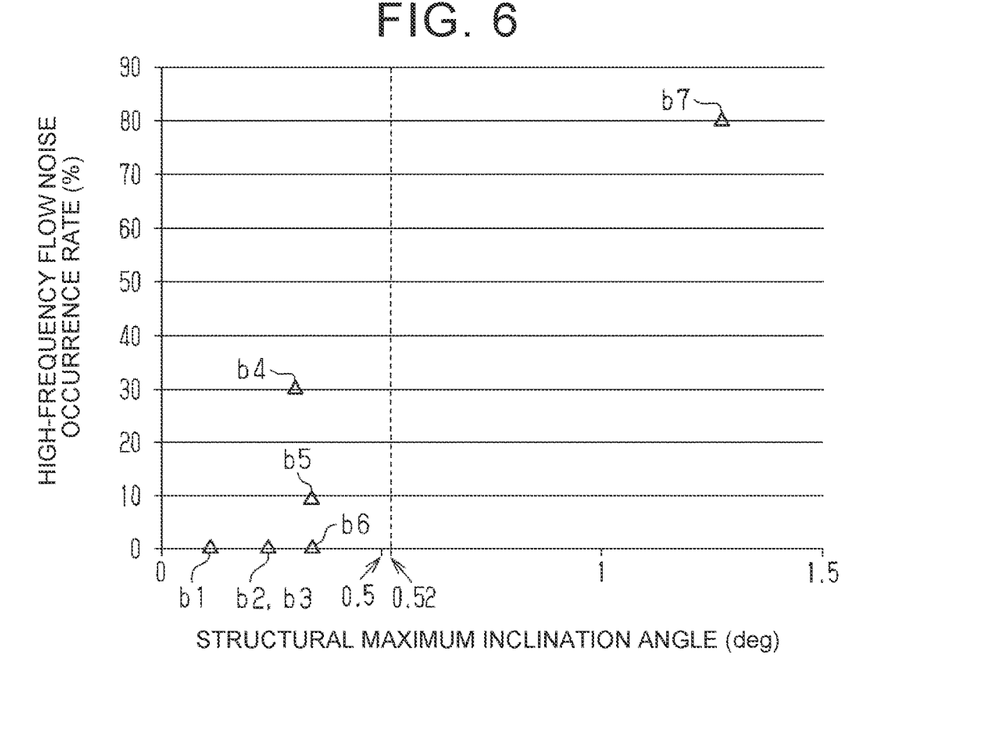
FIG. 6 is a graph illustrating a relationship between a structural maximum inclination angle of the pin and a flow noise occurrence rate.

With regard to the test shown in FIGS. 8 and 6, the structural maximum inclination angle indicates an inclination angle θ at which the pin 52 can be structurally inclined in the plug hole 61 to the maximum extent when the relationship between the gap C and the fitting length L is set as shown in FIG. 8, and the high-frequency flow noise occurrence rate indicates a ratio of the number of times that the inventors sensed high-frequency flow noise among 64 tests performed with the use of the pressure reducing valve 1 of each of the examples and the comparative examples.

As shown in FIGS. 8 and 6, it is found that, in a range where the inclination angle θ of the pin 52 was smaller than 0.52°, the occurrence of high-frequency flow noise could be restrained. Note that, in Examples b4, b5, their high-frequency flow noise occurrence rates are 30% and 9.5%, respectively. This is because the test was performed under the conditions that easily cause high-frequency flow noise as described above. When a fuel-cell vehicle provided with the pressure reducing valve 1 of each of the examples actually travels, it is considered that the occurrence rate can be reduced to be a small rate such as several percent or less. Further, it is found that, even when the test was performed under the conditions that easily cause high-frequency flow noise, in a range where the structural maximum inclination angle of the pin 52 was smaller than 0.26°, the high-frequency flow noise occurrence rate could be reduced to be extremely low.

What is claimed is:

1. A pressure reducing valve comprising:
a body in which a primary port and a secondary port are provided;
a valve seat having an annular shape and a valve hole, the valve seat being provided in an intermediate portion of a gas passage that connects the primary port to the secondary port;
a valve element provided upstream of the valve seat such that a gap is provided between the valve element and an inner peripheral surface of the gas passage, the valve element being configured to make contact with and move away from the valve seat; and
a pressing mechanism configured to press the valve element in a direction in which the valve element moves away from the valve seat, in accordance with a pressure of the secondary port, wherein:
the pressing mechanism includes
a plug provided downstream of the valve seat and having a plug hole extending through the plug in an axial direction of the valve hole, and
a pin including a sliding portion and an upstream end, the sliding portion having a shaft shape and being inserted in the plug hole such that a gap is provided between the sliding portion and an inner peripheral surface of the plug hole, and the upstream end being provided upstream of the sliding portion so as to contact the valve element; and
the pin and the plug are provided such that a fitting length of the sliding portion with respect to the plug hole and the gap between the sliding portion and the plug hole satisfy a following expression:
0.0005 L<C<0.00908 L, where L indicates the fitting length of the sliding portion with respect to the plug hole, and C indicates the gap between the sliding portion and the plug hole.

2. The pressure reducing valve according to claim 1, wherein the fitting length and the gap between the sliding portion and the plug hole satisfy a following expression:

0.0005 L<C<0.00454 L.

* * * * *

UNITED STATES PATENT AND TRADEMARK OFFICE
CERTIFICATE OF CORRECTION

Page 1 of 1

PATENT NO. : 10,534,379 B2
APPLICATION NO. : 16/110617
DATED : January 14, 2020
INVENTOR(S) : Kazuhisa Sugiyama et al.

It is certified that error appears in the above-identified patent and that said Letters Patent is hereby corrected as shown below:

On the Title Page

Item (73) Assignees:
Change "TOYOTA TECHNICAL DEVELOPMENT CORPORATION, Toyota (JP);" to
--TOYOTA JIDOSHA KABUSHIKI KAISHA, Toyota (JP);--

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*